(12) United States Patent
Hofmann et al.

(10) Patent No.: US 11,965,318 B2
(45) Date of Patent: Apr. 23, 2024

(54) METHOD AND SYSTEM FOR DETERMINING PROCESS DATA OF A WORK PROCESS CARRIED OUT BY AN IMPLEMENT

(71) Applicant: Liebherr-Hydraulikbagger GmbH, Kirchdorf/Iller (DE)

(72) Inventors: Ferdinand Hofmann, Kirchdorf/Iller (DE); Anton Renner, Stuttgart (DE); Oliver Sawodny, Stuttgart (DE); Hannes Wind, Stuttgart (DE)

(73) Assignee: LIEBHERR-HYDRAULIKBAGGER GMBH, Kirchdorf (DE)

( * ) Notice: Subject to any disclaimer, the term of this patent is extended or adjusted under 35 U.S.C. 154(b) by 446 days.

(21) Appl. No.: 17/339,849

(22) Filed: Jun. 4, 2021

(65) Prior Publication Data
US 2021/0381201 A1 Dec. 9, 2021

(30) Foreign Application Priority Data
Jun. 5, 2020 (DE) ..................... 10 2020 114 946.8

(51) Int. Cl.
| | |
|---|---|
| *G01G 19/08* | (2006.01) |
| *E02F 9/20* | (2006.01) |
| *E02F 9/26* | (2006.01) |
| *G06F 30/17* | (2020.01) |

(52) U.S. Cl.
CPC ............. *E02F 9/26* (2013.01); *E02F 9/2029* (2013.01); *E02F 9/2041* (2013.01); *E02F 9/262* (2013.01); *E02F 9/265* (2013.01); *G01G 19/08* (2013.01)

(58) Field of Classification Search
CPC ......... G01G 19/08; G06F 30/17; G06F 30/20; G06F 119/02; E02F 3/85; E02F 3/43
See application file for complete search history.

(56) References Cited

U.S. PATENT DOCUMENTS

| | | | | |
|---|---|---|---|---|
| 5,941,921 | A * | 8/1999 | Dasys | E02F 3/434 |
| | | | | 701/50 |
| 2007/0260380 | A1* | 11/2007 | Mintah | G01G 19/083 |
| | | | | 701/50 |
| 2010/0131122 | A1* | 5/2010 | Dersjo | E02F 9/2253 |
| | | | | 701/2 |
| 2014/0107895 | A1* | 4/2014 | Faivre | E02F 9/2029 |
| | | | | 701/50 |
| 2014/0107897 | A1* | 4/2014 | Zhu | E02F 9/264 |
| | | | | 701/50 |
| 2021/0131071 | A1* | 5/2021 | Gratton | E02F 9/2246 |

FOREIGN PATENT DOCUMENTS

| | | |
|---|---|---|
| DE | 102016011530 A1 | 3/2018 |
| DE | 112016003423 T5 | 5/2018 |
| DE | 102018126809 A1 | 4/2020 |
| WO | 2017039514 A1 | 3/2017 |

* cited by examiner

*Primary Examiner* — Tan Q Nguyen
(74) *Attorney, Agent, or Firm* — McCoy Russell LLP

(57) ABSTRACT

The invention relates to a method and a system for determining process data of a work process carried out by an implement based on the determination of a moved mass by a weighing system of the implement and the detection of a parameter concerning a state of the implement and/or a work step, wherein with reference to these and further data a prediction value concerning the remaining part of the current work process is determined and on the basis of which information on the assistance is indicated to the operator of the implement, and to an implement comprising such a system.

15 Claims, 2 Drawing Sheets

METHOD AND SYSTEM FOR DETERMINING PROCESS DATA OF A WORK PROCESS CARRIED OUT BY AN IMPLEMENT

CROSS REFERENCE TO RELATED APPLICATION

The present application claims priority to German Patent Application No. 10 2020 114 946.8 filed on Jun. 5, 2020. The entire contents of the above-listed application is hereby incorporated by reference for all purposes.

TECHNICAL FIELD

The present invention relates to a method and a system for determining process data of a work process carried out by an implement based on the determination of a moved mass by a weighing system of the implement and the detection of a parameter concerning a state of the implement and/or a work step, and to an implement comprising such a system.

BACKGROUND AND SUMMARY

Over the last few years, the exploitation of data which are obtained during the execution of work processes by implements such as excavators, cranes or the like, or are measured specifically for subsequent exploitation, has increased continuously. This can not only be data required directly for the control/regulation of the implement, such as machine state data or performance data of the implement, but what is also determined to an increasing extent is process data which are provided to secondary systems such as order and construction site management systems, in order to monitor and possibly optimize the work processes.

So far, external systems such as stationary scales for recording the handled masses or external billing or management systems have been used to determine such process data. Hence, the determination of the relevant information so far had to be carried out subsequently and for the most part manually, which is time-consuming, error-prone and personal cost-intensive.

Therefore, it is the object underlying the present invention to facilitate the execution, planning and optimization of work processes carried out by means of implements on the basis of process data which characterize the respective work process.

The solution of this object is achieved by a method with all features of claim 1 and by means of a system with all features of claim 13. The method of the invention serves the determination of process data of a work process carried out by an implement and comprises the following steps:
  determining the mass of a payload moved by the implement by means of a weighing system of the implement, i.e. by means of an integrated weighing system,
  recording at least one parameter concerning or characterizing a state of the implement (e.g. a machine state or performance state) and/or a work step of the current work process,
  determining at least one process parameter concerning or characterizing the current work process by taking account of the determined payload mass and the recorded parameter,
  determining at least one prediction value concerning or characterizing a remaining part of the current work process, and
  outputting a signal based on the prediction value to the operator of the implement in order to assist the same in the execution of the current work process.

The determination of the process data according to the invention is effected by means of an integrated system so that recourse to external aids is no longer necessary. The integrated weighing system provides data with respect to the moved payload which are combined with further data concerning a state of the implement and/or the work process to obtain the desired process data. All data required for this purpose are collected by the implement itself and/or provided directly to the implement, for example via an external computer system such as a cloud, a management system, etc.

This results in a considerable simplification of the work process based on an efficient data acquisition and data analysis or evaluation. An additional determination of process data in secondary systems or by manual calculations/evaluations no longer is necessary. This not only reduces the error susceptibility of the system and the costs of the work order, but also increases the work efficiency. An optimization of the current work process and a corresponding assistance for the operator of the implement to realize corresponding measures optimizing the work process now is possible directly and in real time during the execution of the work process. Beside an integration of the implement into cross-linked process and work control systems, it is also possible to organize material transport by secondary systems in a cross-linked operation, for example a construction site or port network, on the basis of the data determined according to the invention.

The determination of a prediction value, i.e. forecast value, concerning a remaining part of the current work process, provides for a quantitative assessment with respect to a remaining part or part to be carried out yet of the current work process. On this basis, suitable optimizations of the workflow can be made, wherein the operator is supported correspondingly in order to implement suitable measures (and generally to carry out the work process).

State of the implement refers both to a machine state, i.e. for example a position, velocity and/or acceleration of a component/tool of the implement, and to a performance state of the implement such as e.g. an energy or fuel consumption, engine state parameter, etc. The process data collected for example are so-called Key Performance Indicators (KPIs), which are particularly relevant and meaningful with regard to the efficiency or other targets of the current work process. The signal based on the prediction value in particular constitutes data which serve for generating an output, for example a visual display, of the corresponding information.

The term "integrated system" used here does not exclude that data are provided by an external computer system such as a cloud, a management system (e.g. planning, order, billing, administration and/or construction site management system) or the like and/or calculations (for example the calculation of the at least one process parameter, of the at least one prediction value, etc.) are outsourced to such an external computer system. The communication with the external computer system preferably is effected wirelessly. The term "external" can mean both outside the implement and outside the machine network Advantageous embodiments of the invention can be taken from the sub-claims and the following description.

The integrated weighing system used for determining the mass of a moved payload (also referred to as handling volume or handling mass) preferably is a system according to DE 10 2018 126 809 A1, the disclosure of which is hereby explicitly referred to. Alternatively or additionally, however, another weighing system can also be used, for example based on another model-based approach for the indirect determination or estimation of the handling mass, on an estimation of the mass with reference to characteristic maps of the forces/torques acting on the actuators of the implement or on a direct physical detection of the moved payload mass by means of a weighing device or scale mounted on the implement.

In one embodiment it is provided that the determined mass of the moved payload is based on the detection of a payload mass moved in an work step of the current work process. Hence, it is possible to represent either a payload mass accumulated over several work steps (e.g. over a particular number of preceding work steps or over all preceding work steps) or the payload mass moved in a single work step.

In another embodiment it is provided that for the detection of the payload mass moved in a single work step of the current work process an estimation is made on the basis of at least one state parameter (=machine state) concerning a current state of the implement and measured by a detection unit of the implement, and of at least one system parameter concerning the configuration of the implement. The machine state can refer to an angular position, velocity and/or acceleration of a swivel element, boom element, arm element, tool and/or hoisting gear of the implement.

In another embodiment it is provided that the at least one detected parameter refers to a defined or definable period, the duration of a work step, a defined or definable number of work steps or a key figure, for example key performance indicator, of the implement. The detected parameter also can refer to a state of the implement, i.e. a machine state such as an angular position, velocity and/or acceleration of a swivel element, boom element, arm element, tool and/or hoisting gear of the implement or another state parameter, or a performance state of the implement such as e.g. an energy consumption etc. Ideally, not only one single, but a plurality of parameters are detected, which represent a plurality of the aforementioned data.

The aforementioned parameters ideally are measured by detection systems of the implement and/or calculated by a control unit from measured and/or received raw data, wherein the latter also can comprise the receipt of data from an external computer system and/or the execution of calculations by such an external computer system. The current machine state for example can be detected by corresponding sensors which directly or indirectly measure the position, velocity and/or acceleration. Furthermore, forces/torques can be determined via pressures in actuators such as e.g. cylinder units. For the calculation of data by an external computer system, measurement data can be transmitted to the same by the implement, preferably wirelessly.

The number of work steps and periods can be calculated by a control unit of the implement itself and/or by an external computer system. Static values such as key figures or key performance indicators of the implement, values concerning its configuration, terrain data etc. can be stored for example in the control unit and/or in a memory or can be provided via a—preferably wireless-communication with an external computer system. As a result, it is no longer necessary to perform any time-consuming external measurements outside the implement, but all essential steps are carried out by the integrated system of the implement or particular data are provided before use or in real time.

In another embodiment it is provided that the determination of the at least one prediction value is effected by taking account of data which concern the scope of the current work process, for example a total handling volume or mass, a total duration, a distance/area/volume to be covered, to be removed or to be worked otherwise, or the like. The data preferably are provided via a manual input by the operator of the implement and/or a transmission from an external computer system and are processed correspondingly by a control unit.

In another embodiment it is provided that the at least one prediction value is or relates to a remaining duration, a remaining handling volume or payload mass to be moved, a remaining excavation (in particular a volume), a remaining number of work steps until termination of the current work process, an energy or fuel consumption of the implement to be expected or a distance still to be covered by the implement or one or more components of the implement. The determination of the one or more prediction values allows a realistic assessment with regard to a or the remaining part of the current work process and represents the basis for an optimization of the work process. As the necessary data surveys and evaluations are carried out by an integrated system (possibly including the calculation and/or transmission of data by an external computer system communicating with a control unit of the implement), timely monitoring and/or optimization of the current work process and a corresponding assistance of the operator is possible.

In another embodiment it is provided that by taking account of the at least one determined prediction value, an adaptation is made on the implement, in particular a variation of at least one performance parameter, a change in the sequence of a work step and/or a change in a configuration of the implement, wherein the adaptation is effected manually by a user input and/or automatically by a control unit of the implement.

Alternatively or additionally, a mere output or display of information on the basis of the at least one determined prediction value is possible, for example for indicating statistical data to the operator of the implement and/or for documentation for a future evaluation.

In another embodiment it is provided that this adaptation is made by minimizing or maximizing a prediction value, i.e. as an optimization, and/or by taking account of at least one defined or adjustable criterion, in particular a maximum duration, a maximum handling volume or moved payload mass, a maximum energy or fuel consumption of the implement and/or a maximum distance traveled by the implement and/or by one or more components of the implement.

It is conceivable, for example, that with reference to the handling volume moved so far, which is detected by means of the weighing system, and the time passed since the beginning of the work process in combination with corresponding targets (in particular of the total handling volume) a total time to be expected for the current work process is determined. On the basis of further process data determined, for example a (tool) utilization per work step, a distance or a path traveled by the implement, along which a component (e.g. tool or hoisting gear) has been moved—considered either as a whole or for a particular work step/cycle—it now is possible to adapt the workflow for the remaining part of the work process in such a way that the prediction values are optimized, i.e. minimized or maximized, or particular criteria/targets are met. This can be effected e.g. via a better utilization of the capacities of the implement or a tool of the implement, or via an optimization of a distance or a path. It is likewise imaginable to adapt performance parameters of the implement in such a way that for example less fuel is consumed per work step.

In another embodiment it is provided that the determination of the prediction value is effected by taking account of a terrain model of the work area to be worked and/or traveled by the implement during the current work process. The terrain model preferably is three-dimensional and can be stored either in a control unit or a memory of the implement or be provided by an external computer system. Furthermore, the implement can include a position detection unit, for example a GPS module, in order to be able to detect the current position of the implement and/or one or more of its components in a three-dimensional space with respect to the terrain model.

In another embodiment it is provided that account also is made of the path along which a tool moving the payload and/or a hoisting gear of the implement moving the tool has been traversed with respect to the terrain model and/or target terrain model during one or more past work steps, wherein preferably a terrain volume moved or removed so far is determined.

Preferably, a target terrain model concerning the planned end result of the current work process is defined (i.e. stored or transmitted) or definable, on which the determination of the prediction value is based. The target terrain model can correspond to the aforementioned terrain model, which has been modified in a way corresponding to the end result of the current work process, for example by digitally removing a volume to be removed by the implement as a whole.

Now, when the terrain model representing the original, unworked work area is available and the path along which the implement or a tool removing the terrain has been or is moved in the coordinate system of the terrain model, a prediction or assessment of the still accruing load mass can be realized in view of a planned excavation (=target). With reference to the traversed path of the tool, the volume removed can be estimated using the terrain model. For example, the tool position and the height profile of the terrain can be used to calculate a volume difference. The height profile of the terrain is digitally adapted corresponding to the penetration depth of the tool. The adaptation of the terrain model with reference to position data collected during the work process can be made at regular intervals, for example after each work step or at specific time intervals.

In combination with the target terrain profile a volume difference can be formed, which describes the remaining and probably accruing volume to be removed. Together with the detection of the total mass corresponding to the removed volume, a value for the density corresponding to the removed volume can be calculated and be taken as a basis for the still accruing volume in order to determine a probably accruing mass/load.

In another embodiment it is provided that the process parameter is or relates to a payload mass or handling volume moved as a whole in a defined or definable period or for a number of work steps, a moved payload mass or handling volume per defined or definable time unit or per work step, an energy or fuel consumption of the implement per work step or per moved payload mass, a duration per work step or a utilization of the implement/tool as a whole or per work step.

In another embodiment it is provided that the emitted signal based on the prediction value is or relates to a detected parameter, a determined prediction value, a payload mass/handling volume moved so far, the difference of a payload mass moved so far to a defined or definable target mass and/or a specification for a payload mass/volume to be picked up or to be moved in a future work step. The signal preferably is visually displayed on a display unit and comprises a plurality of display data.

Preferably, a graphical display unit is present in the driver's cabin of the implement, on which the above-mentioned or other values are displayed numerically and/or graphically and visually assist the operator during the work process. It is conceivable, for example, to display the above-mentioned terrain model, target terrain model and/or the current position/path of the implement and/or of a tool. The displays can be effected for example side by side or superimposed. The graphical displays can be completed by numerical displays of the corresponding values/parameters. Additionally or as an alternative to an optical display, the output of acoustic signals is also possible, for example when a particular spatial area is left or when a particular criterion or a particular prediction value is exceeded or fallen short of or approached.

Furthermore, there is preferably provided an input unit via which the operator can make inputs in order to define or change for example particular targets so as to vary display criteria of the indicated values or to fix or vary calculation criteria for the process data and/or the prediction value.

The present invention furthermore relates to a system for determining process data of a work process carried out by an implement, comprising:
- a hoisting gear which is designed to move a payload along a path, in particular by means of a tool mounted on the hoisting gear (such as a grab, an excavator shovel, etc.),
- a weighing system by means of which the mass of a payload moved in a single work step of the current work process can be determined,
- a detection unit by means of which at least one parameter concerning or characterizing a state of the implement and/or a work step of the current work process can be detected,
- a control unit which is designed to carry out the method according to the invention, and
- an output unit via which the signal based on the determined prediction value can be output to the operator of the implement.

Quite obviously, the same advantages and properties are obtained as for the method of the invention, which is why a repetitive description will be omitted at this point. The above explanations with respect to the possible embodiments of the method of the invention therefore correspondingly apply for the system.

As already explained above, the fact that the control unit is designed to carry out the method of the invention already includes the fact that the control unit, in particular via suitable interfaces, and preferably wirelessly, is communicatively connected to an external computer system such as a cloud, a management system (e.g. planning, order, billing, administration and/or construction site management system). Data can be provided by the external computer system and/or calculations (for example the calculation of the process parameter, the prediction value, etc.) can be outsourced to such an external computer system. For this purpose, measured values or other data can be transmitted from the implement to the external computer system, on the basis of which calculations then are made and the results are again transmitted to the implement.

In one embodiment it is provided that the system comprises one or more sensors by means of which at least one parameter concerning a state of the implement and/or a work step of the current work process and/or a force/torque acting on the hoisting gear can be detected.

The present invention furthermore relates to an implement comprising a system according to the invention, i.e. the implement includes a control unit which is designed to carry out the method according to the invention. Here as well, the properties and advantages described above are obtained. The implement can be any working machine by means of which material can be moved or handled, for example a crane (e.g. a port crane), excavator or the like.

BRIEF DESCRIPTION OF THE FIGURES

Further features, details and advantages of the invention can be taken from the exemplary embodiments explained with reference to the Figures. In the drawing.

DETAILED DESCRIPTION

Figure 1:
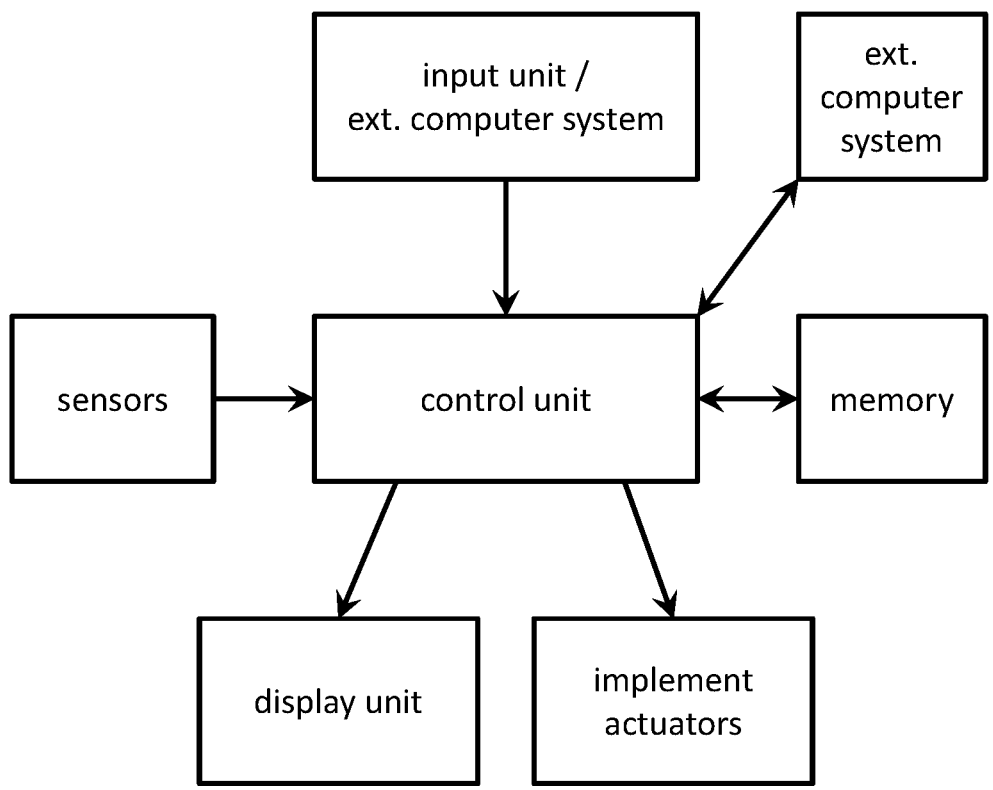
FIG. 1: shows a schematic representation of the components of the system of the invention according to an exemplary embodiment.

FIG. 1 shows a schematic representation of an exemplary embodiment of the inventive system for determining process data of a work process carried out by an implement. A central element is formed by a control unit which performs calculations and evaluations required for determining process data and prediction values, which can include a communication of the control unit with an external computer system that carries out a part or all of the calculations outside the implement and transmits the results to the implement or to the control unit. In other words, the calculations and evaluations can be carried out either completely by the control unit of the implement, completely by the external computer system or in part by the control unit and in part by the external computer system.

As an input, the control unit receives data from a plurality of sensors, which data characterize a state of the implement or a machine state. These data can be sensor data concerning the position, velocity and/or acceleration of a lifting element or a tool attached thereto, by means of which the payload is moved. Furthermore, data concerning forces or torques acting on the hoisting gear/tool can be detected and transmitted to the control unit.

From the sensor data and data stored in a memory, such as system parameters, the control unit determines a moved payload mass. The weighing system of the implement thus implemented is described in detail in DE 10 2018 126 809 A1. Beside the determined payload mass further data are employed, which relate to a machine state and/or a work step of the current work process. Beside the sensors of the implement, an external computer system (for example a cloud, a construction site management system, an administration system or the like), which is able to wirelessly transmit the data to the implement (in this case, the implement includes a corresponding transmitting and receiving device), a manual input by the operator via the input unit and/or data stored on a memory are the source of these additional data. Furthermore, ambient data are available to the control unit, for example in the form of a three-dimensional terrain model.

Figure 2:
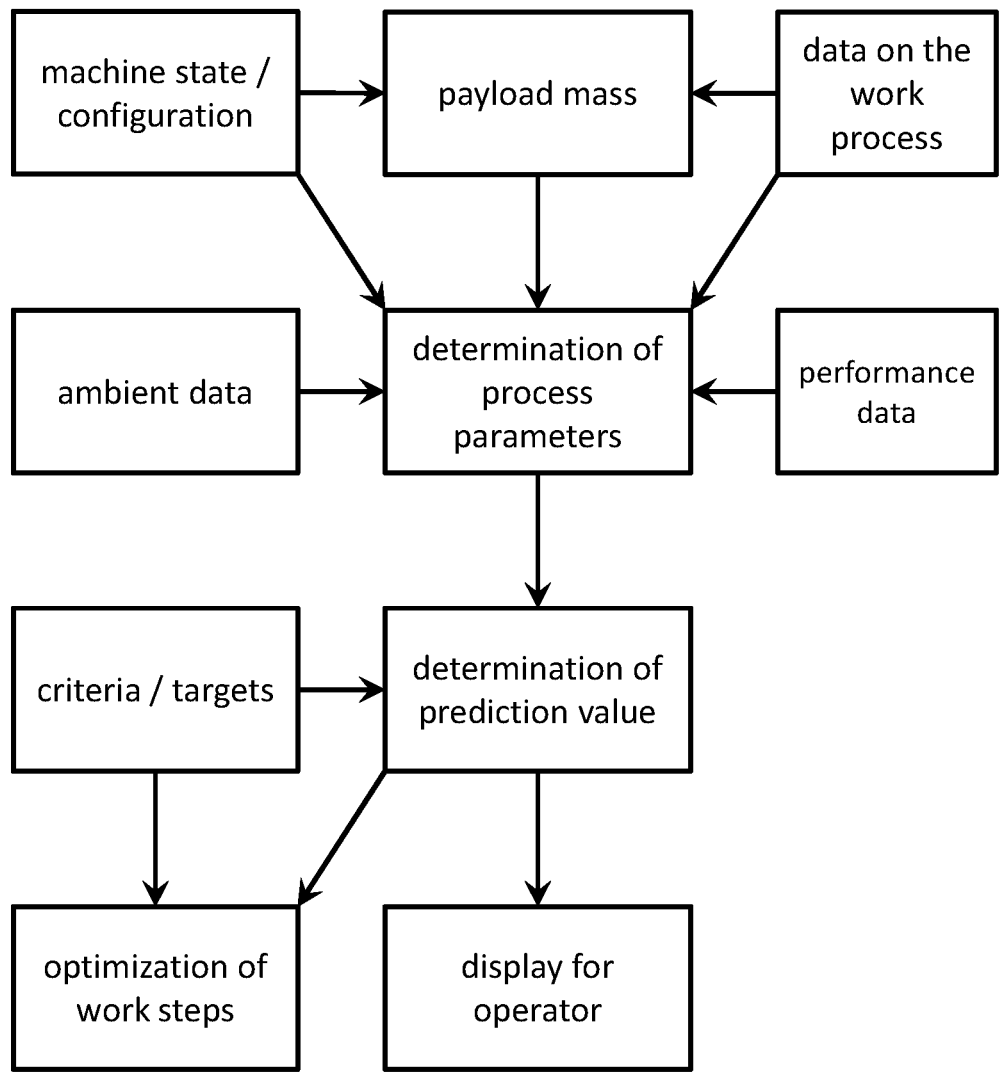
FIG. 2: shows a schematic representation of the steps of the method of the invention and the information or data used therein according to an exemplary embodiment.

While FIG. 1 shows the system of the invention with regard to its components, FIG. 2 illustrates an exemplary embodiment of the method of the invention in the light of the individual steps and sources of information included in the calculations and analyses of the control unit. The control unit combines the information on the moved payload mass with the additional information on the machine state, performance, environment and/or work process and generates one or more process parameters or process data from such information. Concrete examples of this will be described below. From the calculated process parameters, the information included therein as well as specified criteria or targets (which themselves can again comprise ambient data such as a target terrain model), the control unit determines at least one prediction value which relates to a part or the remaining part of the current work process, for example to a remaining time or payload mass to be moved.

Proceeding from the determined process data and prediction values, output data are finally generated, which are indicated to the operator on an output unit, in particular on a display in a driver's cabin of the implement. This supports the operator in the remaining execution of the work process. Moreover, an optimization of the work steps left up to the end of the work process is effected proceeding from the prediction values and defined criteria/targets. This can be effected automatically by a corresponding control/regulation of the actuators of the implement, for example of the hoisting gear, or manually by a control of the operator for whom corresponding instructions concerning the modification of the work steps are indicated on the display unit.

The exemplary embodiments illustrated here each represent only one of many possibilities to combine the described information and use the same to determine process data and prediction values. In the following, a number of examples for possible determinable process data, prediction values and assistance possibilities will be given.

According to the invention, the weighing system of the implement is used to determine process data along with further information. This is done by using further information of the implement beside the weighing data. This information for example relates to the key performance indicators of the implement and to current performance and state data. The generated process data for example include the following information and KPIs (Key Performance Indicators):

Example P1: Total handling performance or total payload mass moved, accumulated over a defined period of time.

The period of time can be set in the system either by the machine operator or by the operating company or by an order management system which communicates with the implement via interfaces, in particular wirelessly. The accumulated mass or load $m_{load,total,n}$ can be determined by the following calculation rule:

$$m_{load,total,n} = \Sigma_{k=1}^{n} m_{load}(t_{cycle,end,k}),$$

wherein $t_{cycle,end,k}$ represents the end time of each loading cycle. Example: For the order "xy" 130 t were handled in a time of 3 hours.

Example P2: Handling performance or moved payload mass per time.

Here, e.g. the average handling performance of the implement can be calculated per unit time. Preferably, various time bases can be configured according to the requirements of secondary evaluation systems. Example: Handling mass (t) per hour/shift/day. The determination of the average handling performance per cycle $m_{load,\emptyset,n}$ can be determined by the following calculation rule:

$$m_{load,\emptyset,n} = \frac{1}{n} m_{load,total,n}.$$

Example P3: Fuel consumption or energy demand of the implement per handled mass, hence e.g. l/t or kWh/t.

Example P4: Statistical key figures for the classification of loading cycles.

For example a minimum, maximum or average time per loading cycle can be determined, as well as a handled mass per loading cycle (a loading cycle in particular is a work step comprising a pick-up of a payload, a deposition of the payload and a movement of the implement to again pick up another payload). The average cycle time $t_{cycle,\emptyset,n}$ can be calculated with reference to the determined points in time $t_{deposit,k}$ and $t_{deposit,k-1}$ and the number n of the cycles by means of the formula:

$$t_{cycle,\emptyset,n} = \frac{1}{n}\sum_{k=1}^{n} t_{deposit,k} - t_{deposit,k-1}$$

The time points of the material pick-up $t_{pick-up,k}$ and $t_{pick-up,k-1}$ can be determined by manual operation or by combining various information such as control lever interventions of the machine operator or other sensors and systems.

Example P5: Equipment utilization of the machine per loading cycle and statistical evaluation over several loading cycles. The implement utilization can be determined by means of key figures of the drive system and performance parameters. With these values and a classification, load spectra can be determined.

Furthermore, predictions and estimations concerning the current work process can be carried out. The scope of the current work order is known to the system of the invention either via manual inputs or from other systems and planning tools. Thus, for example the remaining working time until completion of the order can be determined.

It is also possible to perform adaptations on the implement in order to be able to carry out the work order e.g. within the requested time. For this purpose, performance configurations of the implement as well as further adjustable criteria such as an energy-efficient or the fastest possible processing of the order are taken into account. The system adapts the settings of the implement to the execution of the current work order, and the use of the implement is optimized.

When a terrain model also is present and the traversed path of the implement or of a tool attached thereto and picking up the payload is known in terms of world coordinates, a prediction of the load mass accruing yet can be realized in view of a planned excavation. With reference to the traversed path of the tool, the volume removed can be assessed using the terrain model. For example, the tool position and the height profile of the terrain can be used to calculate a volume difference. The height profile of the terrain is adapted corresponding to the penetration depth of the tool. Thus, the removed volume $V_{load,n}(t_{cycle,end,n})$ can be determined for each cycle. Analogous to the calculations for the load mass, the accumulated volume $V_{load,total,n}$ can be inferred equivalently over all previous cycles. With this information, an estimate can be obtained for the density $\rho_{load,total,n}$ with the quotient:

$$\rho_{load,total,n} = \frac{m_{load,total,n}}{V_{load,total,n}}$$

When a target terrain profile is defined, a volume difference can be formed again by means of the current terrain profile. The volume difference describes the remaining and probably accruing volume $V_{rest,n}$. The still accruing load hence can be assessed by using the relation $$m_{rest,n} = \rho_{load,total,n} \cdot V_{rest,n}$$

By evaluating these data it is likewise possible to obtain information on the handled material. Furthermore, in a cross-linked construction site or port network, the transport of material can be organized by secondary systems on the basis of the information determined.

The system according to the invention can assist the operator for example by displaying the following information during the execution of the work order:

Example A1: The handled masses are added up over several work cycles and displayed to the operator. The counter preferably can be reset manually.

Example A2: To perform work orders, a target weight can be configured in the system by the operator. The handled mass now is added up and the difference to the target weight configured is displayed. Furthermore, the target weight can be specified via interfaces from external order management systems.

Example A3: A plurality of target sites and mass counters can be set. For example, the loaded masses on a truck and on a trailer attached to the truck can be weighed separately.

Example A4: The system according to the invention can make suggestions to the operator on how to fill the tool, taking into account the tool content and knowledge of the material to be loaded. In doing so, the difference to the target weight of the order is taken into account. This is to be illustrated by the following concrete example: The work order comprises the movement of a total mass of 9 t, the maximum admissible or fillable/receivable mass in the tool per handling cycle amounts to 4 t. The system according to the invention suggests three loading cycles each with a moved mass of 3 t. After the first loading cycle 3.6 t were handled, the system updates the target weight for the remaining two loading cycles to 2.7 t each. After the second loading cycle, the remaining mass to be moved is updated again.

The invention claimed is:

1. A method for determining process data of a work process carried out by an implement, comprising the following steps:
    determining the mass of a payload moved by the implement by means of a weighing system of the implement,
    detecting at least one parameter concerning a state of the implement and/or a work step of the current work process,
    determining at least one process parameter concerning the current work process by taking account of the determined payload mass and the detected parameter,
    determining at least one prediction value concerning a remaining part of the current work process, and
    outputting a signal based on the prediction value to the operator of the implement in order to assist the same in the execution of the current work process, the output signal based on the prediction value is or relates to a detected parameter, a determined prediction value, a payload mass moved so far, the difference of a payload mass moved so far to a defined or definable target mass and/or a specification for a payload mass to be picked up or to be moved in a future work step.

2. The method according to claim 1, wherein the determined payload mass is based on the detection of a payload mass moved in work step of the current work process.

3. The method according to claim 2, wherein for the detection of the payload mass moved in a single work step of the current work process an estimation is carried out on the basis of at least one state parameter concerning a current state of the implement and measured by a detection unit of the implement, wherein the state parameter comprises an angular position, angular velocity and/or angular acceleration of a swivel element, boom element, arm element and/or hoisting gear of the implement, and on the basis of at least one system parameter concerning the configuration of the implement.

4. The method according to claim 1, wherein the detected parameter is a defined or definable period, the duration of a work step, a defined or definable number of work steps, a key figure of the implement, a machine parameter or a performance parameter of the implement.

5. The method according to claim 1, wherein the determination of the prediction value is effected by taking account of data concerning the scope of the current work process, wherein the data preferably are obtained via a manual input and/or a transmission from an external computer system.

6. The method according to claim 1, wherein the at prediction value is or relates to a remaining duration, a remaining handling volume or payload mass to be moved, a remaining excavation, a remaining number of work steps until termination of the current work process, an energy consumption of the implement to be expected or a distance still to be traveled by the implement or by one or more components of the implement.

7. The method according to claim 1, wherein, by taking account of the prediction value, an adaptation is made on the implement, and the adaptation comprises a variation of at least one performance parameter, a change in the sequence of a work step and/or a change in a configuration of the implement, wherein the adaptation is carried out manually by a user input and/or automatically by a control unit of the implement.

8. The method according to claim 7, wherein the adaptation is made by minimizing or maximizing a prediction value and/or by taking account of at least one defined or adjustable criterion, comprising a maximum duration, a maximum handling volume or moved payload mass, a maximum energy consumption of the implement and/or a maximum distance traveled by the implement and/or by one or more components of the implement.

9. The method according to claim 1, wherein the determination of the prediction value is effected by taking account of a terrain model of the work area to be worked and/or traveled by the implement during the current work process, wherein preferably a target terrain model referring to the planned end result of the current work process is defined or definable, on which the determination of the prediction value is based.

10. The method according to claim 9, wherein account also is made of the path along which a tool moving the payload and/or a tool moving the hoisting gear of the implement has been traversed with respect to the terrain model and/or target terrain model during one or more past work steps, wherein preferably a terrain volume moved or removed so far is determined.

11. The method according to claim 1, wherein the process parameter is or relates to a payload mass moved as a whole in a defined or definable period or for a number of work steps, a moved payload mass per defined definable time unit or per work step, an energy consumption of the implement per work step or per moved payload mass, a duration per work step or a utilization of the implement as a whole or per work step.

12. The method according to claim 1, wherein the signal preferably is optically displayed on a display unit.

13. A system for determining process data of a work process carried out by an implement, comprising:
 a hoisting gear which is designed to move a payload along a path via a tool mounted on the hoisting gear,
 a weighing system by means of which the mass of a payload moved in a single work step of the current work process can be determined,
 a detection unit by means of which at least one parameter concerning a state of the implement and/or a work step of the current work process can be detected,
 a control unit which is designed to carry out the method according to claim 1, and
 an output unit via which the signal based on the determined prediction value can be output to the operator.

14. The system according to claim 13, wherein the system comprises one or more sensors by means of which at least one parameter concerning a state of the implement and/or a work step of the current work process and/or a force acting on the hoisting gear can be detected.

15. An implement comprising a system according to any of claim 13.

* * * * *